(12) United States Patent
Leu et al.

(10) Patent No.: US 8,207,256 B2
(45) Date of Patent: Jun. 26, 2012

(54) ORGANIC/INORGANIC HYBRID MATERIAL AND FABRICATION METHOD THEREOF

(75) Inventors: Chyi-Ming Leu, Hsinchu County (TW); Yung-Lung Tseng, Zhubei (TW); Tzong-Ming Lee, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 0 days.

(21) Appl. No.: 12/954,834

(22) Filed: Nov. 26, 2010

(65) Prior Publication Data

US 2011/0130495 A1 Jun. 2, 2011

(30) Foreign Application Priority Data

Nov. 27, 2009 (TW) .................................. 98140515
Nov. 25, 2010 (TW) .................................. 99140710

(51) Int. Cl.
*C08K 3/20* (2006.01)
(52) U.S. Cl. ........ 524/430; 524/431; 524/432; 524/437; 524/492; 524/493
(58) Field of Classification Search .......... 524/430–432, 524/437, 492–493
See application file for complete search history.

(56) References Cited

U.S. PATENT DOCUMENTS

2007/0102040 A1* 5/2007 Beckenbaugh et al. ...... 136/263
2009/0169865 A1* 7/2009 Risse et al. .................... 428/323

FOREIGN PATENT DOCUMENTS

JP 2005-187768 A 7/2005

OTHER PUBLICATIONS

Wang et al., "Novel Polyimide/Silica Nanohybrids from Water Glass", Polymer Bulletin 51, 63-68 (2003).

* cited by examiner

*Primary Examiner* — Peter Szekely
(74) *Attorney, Agent, or Firm* — PAI Patent & Trademark Law Firm; Chao-Chang David Paj

(57) ABSTRACT

An organic/inorganic hybrid material is provided, which includes an organic polymer and a plurality of inorganic nanoparticles, wherein the inorganic nanoparticles are self-connected or connected via a linker to constitute an inorganic network structure. By forming the inorganic network structure through interconnection of inorganic nanoparticles, the inorganic content in the hybrid materials can be drastically increased to improve the properties thereof. A method for fabricating the organic/inorganic hybrid material is also provided.

20 Claims, 3 Drawing Sheets

ORGANIC/INORGANIC HYBRID MATERIAL AND FABRICATION METHOD THEREOF

CROSS REFERENCE TO RELATED APPLICATIONS

This application claims priority of Taiwan Patent Application No. 098140515, filed on Nov. 27, 2009 and Taiwan Patent Application No 99140710, filed on Nov. 25, 2010, the entirety of which is incorporated by reference herein. The subject matter of this application relates to that of copending application filed Nov. 26, 2010 for "Organic/inorganic hybrid material and fabrication method thereof" by Leu, Lee and Yang. The disclosure of the copending application is incorporated herein by reference in their entirety.

BACKGROUND OF THE INVENTION

1. Field of the Invention

The present invention relates to an organic/inorganic hybrid material, and in particular relates to an organic/inorganic hybrid material having an inorganic network structure.

2. Description of the Related Art

Organic/inorganic hybrid materials consisting of a combination of an inorganic material and an organic phase combine the properties of organic and inorganic materials. Inorganic materials such as glass, fiber, clay, and carbon black are typically added to an organic polymer as a filler or as a reinforcing agent to improve physical properties and reduce production cost. The effectiveness of inorganic filler is generally determined by the degree of dispersion of the inorganic filler in the polymer matrix. By conventional mechanical blending, only a micro-scale dispersion of the inorganic filler can be achieved and the improvement in physical properties is limited. Using the novel organic/inorganic nano-hybrid technique, inorganic filler can be dispersed in the organic matrix in a nano-scale, greatly improving physical properties due to the greater contact surface between the organic phase and inorganic phase. The nano-hybrid material is characterized by high transparency, high thermal resistance, low coefficient of thermal expansion, and excellent mechanical properties. In order to increase the physical properties, the key issue in developing hybrid materials is to increase the amount of inorganic filler present in the hybrid.

Japanese Patent Publication no. 2005187768 discloses a polyimide/inorganic composite material having a silica content up to 20 wt %. Polymer Bulletin 51. 63-68 (2003) discloses the synthesis of polyimide/silica hybrid via a sol-gel route, wherein polyimide and silica are connected by a coupling agent with covalent bonds. The hybrid films thus obtained can keep their transparency at up to 40 wt % silica content. However, when the silica content is greater than 40 wt %, silica particles will agglomerate due to insufficient polymer content, resulting in opaque, brittle films.

Accordingly, it is highly desirable to increase the inorganic content to improve the physical properties while maintaining the transparency and flexibility of the organic/inorganic hybrid materials.

BRIEF SUMMARY OF THE INVENTION

The invention provides an organic/inorganic hybrid material, comprising an organic polymer; and a plurality of inorganic nanoparticles; wherein the inorganic nanoparticles are self-connected, or connected via a linker to constitute an inorganic network structure.

The invention also provides a method for fabricating an organic/inorganic hybrid material, comprising (a) providing an organic dispersion of inorganic nanoparticles; and (b) mixing the organic dispersion with a polymer solution to form an organic/inorganic hybrid material, wherein the inorganic nanoparticles are self-connected or connected via a linker to constitute an inorganic network structure.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a novel route to form an inorganic network matrix in organic/inorganic hybrid materials by interconnection of inorganic particles. By the formation of an inorganic network structure, the hybrid films thus obtained can keep their transparency and flexibility at above 50 wt % inorganic content, and exhibit improved thermal resistance and dimensional stability.

Figure 1:
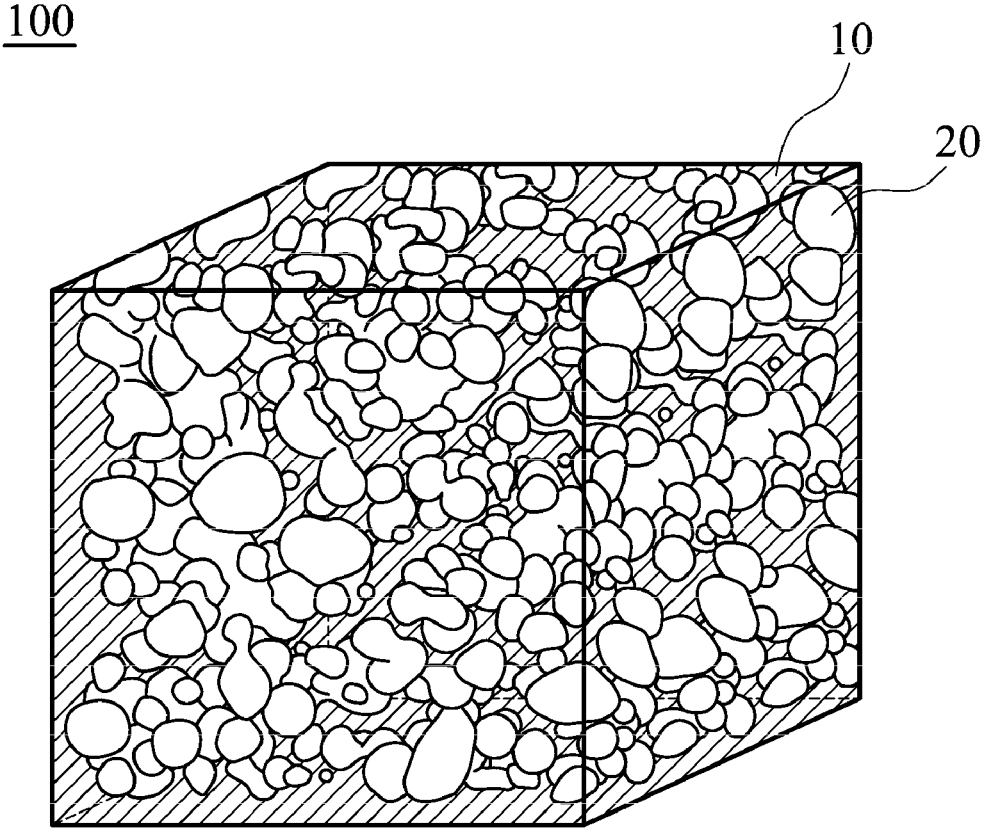
FIGS. 1-2 are schematic views of the organic/inorganic hybrid materials according to two different embodiments of the invention.

Referring to FIG. 1, a schematic view of the organic/inorganic hybrid material 100 according to an embodiment of the invention is shown. The organic/inorganic hybrid material 100 includes an organic polymer 10 and an inorganic network structure 20, wherein the inorganic network structure is a continuous phase constituted by a plurality of inorganic particles having a diameter of 5-500 nm through self-connection or connection with a linker. The organic polymer 10 may or may not be chemically bonded to the inorganic network structure 20. Thus, the hybrid material of the invention is characterized by the formation of organic-inorganic bicontinuous phases. This is distinct from the conventional approaches by dispersing inorganic particles in a continuous organic phase or forming organic-inorganic linkage by covalent bonds.

In conventional hybrid materials, the inorganic particles are dispersed in polymer matrix as a discontinuous phase, and when the inorganic content is increased to over 50 wt %, the haze level of the hybrid materials will increase due to light scattering of the inorganic particles, resulting in poor transparency. On the other hand, in the hybrid materials of invention, the inorganic particles form a three-dimensional network such that the hybrid materials can keep high transparency even at a considerably high inorganic content (>50 wt %).

Figure 2:
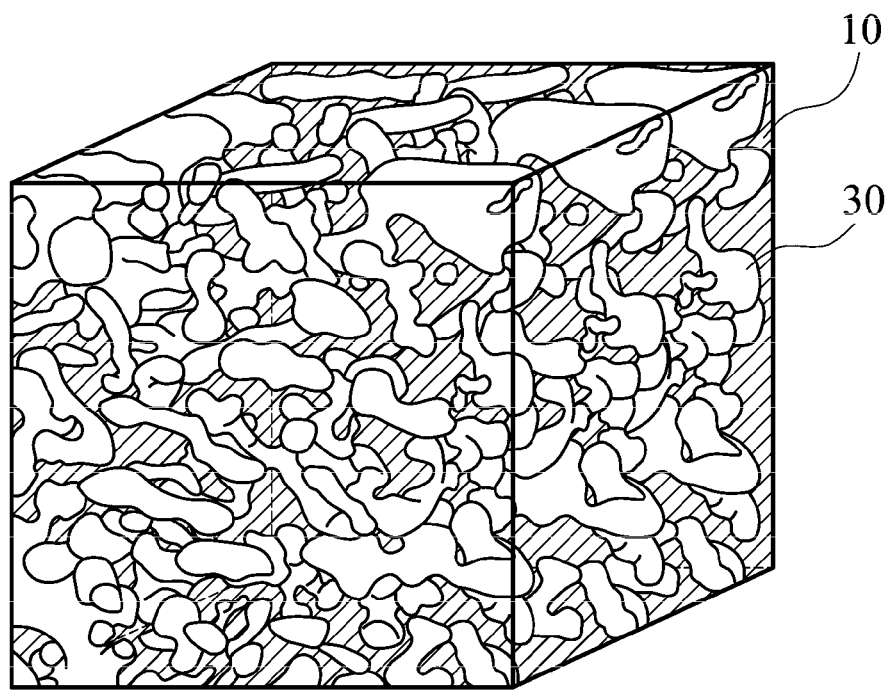

It should be noted that although FIG. 1 shows an inorganic network structure 20 formed by spherical inorganic particles, the invention is not so limited. Rather, the inorganic network structure can be formed by inorganic particles of other shapes including chain shape, rod shape, branch shape, or combinations of different shapes. For example, FIG. 2 shows an organic/inorganic hybrid material 200 according another embodiment of the invention, which includes an organic polymer 10 and an inorganic network structure 20 formed by chain-shaped inorganic nanoparticles.

The organic/inorganic hybrid material of the invention may be prepared from an organic dispersion of inorganic nanoparticles and a polymer solution. In one embodiment, the inorganic nanoparticles are connected to each other by themselves to form the above described inorganic network structure. In another embodiment, a linker can be used to connect the inorganic nanoparticles to form the inorganic network structure.

The inorganic nanoparticles suitable for use herein are preferably inorganic oxides, which include (but are not limited to) silicon oxide, titanium oxide, aluminum oxide, zirconium oxide, vanadium oxide, chromium oxide, iron oxide, antimony oxide, tin oxide, or combinations thereof. The diameter of the inorganic nanoparticles may range from about 5 nm to about 500 nm, preferably from about 20 nm to about 300 nm. The particle shape may include spherical shape, chain shape, branch shape, and rod shape. Also, the nanoparticles may have a core-shell structure. For example, the shell is composed of one kind of oxide, and the core is composed of another kind of oxide or even non-oxide materials. It is more preferable that the nanoparticles contain hydroxyl groups, either inherently or by surface modification.

According to the method of the invention, the inorganic nanoparticles are provided in an organic dispersion (organosol) using an organic solvent such as N-methyl-2-pyrrolidone (NMP), N,N-dimethylacetamide (DMAc), N,N-dimethylformamide (DMF), dimethyl sulfoxide (DMSO), γ-butyrolactone (GBL), xylene, toluene, or combinations thereof. The organic dispersion may be commercially available or readily prepared from a corresponding aqueous dispersion (water sol). For example, an organic solvent and a volatile solvent such as isopropanol can be added to an aqueous dispersion to remove the water content by co-distillation, thereby forming an organic dispersion. The solid content of the organic dispersion is preferably about 5-50 wt %, more preferably about 15-40 wt %.

The organic polymer suitable for use herein is not specifically limited, as long as it is soluble in an organic solvent. Illustrative examples of the organic polymer include, but are not limited to, polyimide (PI), polyurethane (PU), polycarbonate (PC), polyarylate resin (PAR), poly(ether sulfones) (PES), cyclo-olefin copolymer (COC), or combinations thereof. A polymer solution is provided by dissolving the organic polymer in an organic solvent such as N-methyl-2-pyrrolidone (NMP), N,N-dimethylacetamide (DMAc), N,N-dimethylformamide (DMF), dimethyl sulfoxide (DMSO), γ-butyrolactone (GBL), xylene, toluene, or combinations thereof. The organic solvent used in the polymer solution is preferably the same or miscible with the organic solvent used in the organic dispersion. The solid content of the polymer solution is preferably about 1-100 wt %, more preferably about 10-50 wt %.

A linker can be used in the invention to provide linkage between inorganic nanoparticles to form the inorganic network structure. The linker used herein is preferably alkoxysilane or metal alkoxide, more preferably amino-containing alkoxysilane or amino-containing metal alkoxide such as (3-aminopropyl)triethoxysilane and aminoethylaminopropyl-trimethoxysilane. The amino group of the linker can catalyze the reaction between the linker and the inorganic nanoparticles. The linker can be added in an amount of about 0.1-100 wt %, preferably about 5-50 wt %, based on the weight of the inorganic nanoparticles. However, it should be noted that the inorganic network structure can be formed without adding the linker.

Figure 3A:
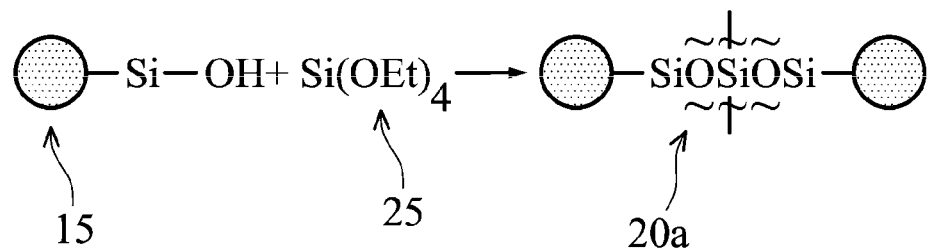
FIGS. 3a-3b shows two different mechanisms for the formation of the inorganic network structure.
Figure 3B:
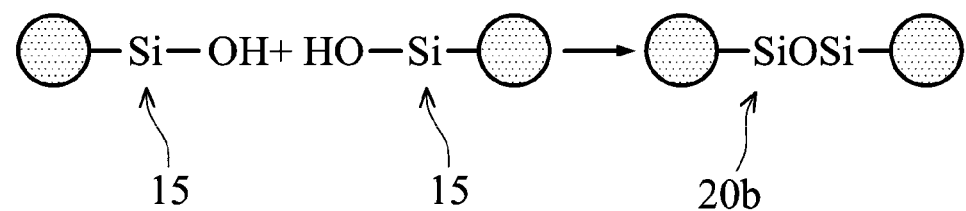

FIG. 3a shows a mechanism for the formation of the inorganic network structure 20a via the aid of linker, taking silica nanoparticles 15 and alkoxysilane linker 25 as an example. FIG. 3b shows a mechanism for the formation of the inorganic network structure 20b via self-connection of the inorganic nanoparticles, taking silica nanoparticles 15 as an example.

For self-connection of the inorganic nanoparticles, a diamine, preferably a cycloaliphatic diamine may be used as a catalyst. Examples of suitable cycloaliphatic diamines include as 3-aminomethyl-3,5,5-trimethylcyclohexylamine (IPDA; isophorone diamine), 1,2-diaminocyclohexane, 1,4-bis(aminocyclohexyl)methane, 1,3-bis(aminomethyl)cyclohexane, and bis(aminomethyl)norbornane. Alternatively, a tertiary amine may also be used as a catalyst for the self-connection. The catalyst can be added in an amount of about 0.01-2 wt %, preferably 0.1-1 wt %, based on the total weight of the organic/inorganic hybrid material (including the solvent therein).

In one embodiment, the organic dispersion of inorganic nanoparticles, the polymer solution, and the linker (or the catalyst in the case of self-connection) are stirred at room temperature for 0.5-24 hours to complete the reaction. The resulting mixture can be coated on a substrate and dried to obtain the organic/inorganic hybrid material. The coating procedure can be achieved by various coating techniques such as spin coating, blade coating, bar coating, roll coating, screen printing, and so on. The drying procedure is typically carried out at a temperature of 40-350° C. for 1-5 hours, depending on the organic solvent used.

By forming the inorganic network structure through interconnection of inorganic nanoparticles, the inorganic content in the hybrid materials can be drastically increased to improve the properties thereof. In general, the inorganic content can be altered at between about 20-80 wt %, and preferably between about 40-80 wt % to improve the thermal resistance and dimensional stability while keeping a high transparency (a transmittance >85%) and flexibility (elongation percentage >2%). The organic/inorganic hybrid materials of the invention can be fabricated into various forms including a film, a plate, a bulk material, or a surface coating.

In the following examples, all percentages are by weight unless otherwise specified.

EXAMPLE 1

Synthesis of Polyimide Polymer Solution BB (B1317-BAPPm)

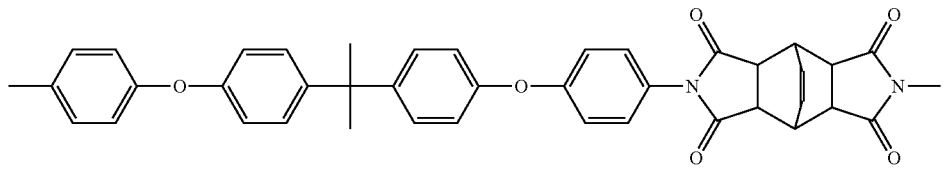

0.0147 mole of 4,4'-bis(aminophenoxy)propane (BAPPm) was added to a stirred solvent of 32.94 g of m-cresol in a three-necked bottle under $N_2$ at room temperature. After the BAPPm dissolved, 0.015 mole of bicyclo[2.2.2]oct-7-ene-2,3,5,6-tetracarboxylic dianhydride (B1317) was added to the solution. After the B1317 dissolved, the solution was stirred for 1 hour, and a paste solution of polyamic acid was formed and heated to 220° C. for 3 hours, during which water was distilled from the solution, and a reaction mixture containing polyimide was formed. The mixture was slowly added to methanol in order to precipitate polyimide. The precipitated polyimide was dried in vacuum oven for 12 hours, and dissolved in DMAc to provide a polyimide polymer solution BB of 20% solid content.

EXAMPLE 2

Synthesis of Nano-silica Dispersion A 100 g of acidic aqueous silica sol-gel (spherical particle, 20 nm in size) having a solid content of 20%, 80 g of isopropanol, and 80 g of DMAc were charged in a 500 ml reactor flask. Water and isopropanol was distilled from the mixture at 25-40° C. under reduced pressure, thus giving a DMAc dispersion A having a solid content of 20%.

EXAMPLE 3

Synthesis of Nano-silica Dispersion B 100 g of acidic aqueous silica sol-gel (chain-shaped particle, 300 nm in size) having a solid content of 20%, 60 g of isopropanol, and 60 g of DMAc were charged in a 500 ml reactor flask. Water and isopropanol was distilled from the mixture at 25-40° C. under reduced pressure, thus giving a DMAc dispersion B having a solid content of 20%.

EXAMPLE 4

Synthesis of 20% Nano-silica (A)/Polyimide (BB) Hybrid Substrate 2 g DMAc dispersion A and 8 g polyimide polymer solution BB were charged in a 20 ml sample flask at room temperature. After adding 0.08 g amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 20% silica (A)/polyimide (BB) hybrid substrate.

EXAMPLE 5

Synthesis of 30% Nano-silica (A)/Polyimide (BB) Hybrid Substrate 3 g DMAc dispersion A and 7 g polyimide polymer solution BB were charged in a 20 ml sample flask at room temperature. After adding 0.07 g amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 30% silica (A)/polyimide (BB) hybrid substrate.

EXAMPLE 6

Synthesis of 40% Nano-silica (A)/Polyimide (BB) Hybrid Substrate 4 g DMAc dispersion A and 6 g polyimide polymer solution BB were charged in a 20 ml sample flask at room temperature. After adding 0.06 g amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 40% silica (A)/polyimide (BB) hybrid substrate.

EXAMPLE 7

Synthesis of 50% Nano-silica (A)/Polyimide (BB) Hybrid Substrate 5 g DMAc dispersion A and 5 g polyimide polymer solution BB were charged in a 20 ml sample flask at room temperature. After adding 0.05 g amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 50% silica (A)/polyimide (BB) hybrid substrate.

EXAMPLE 8

Synthesis of 60% Nano-silica (A)/Polyimide (BB) Hybrid Substrate 6 g DMAc dispersion A and 4 g polyimide polymer solution BB were charged in a 20 ml sample flask at room temperature. After adding 0.04 g amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 60% silica (A)/polyimide (BB) hybrid substrate.

EXAMPLE 9

Synthesis of 70% Nano-Silica (A)/Polyimide (BB) Hybrid Substrate 7 g of DMAc dispersion A and 3 g of polyimide polymer solution BB were charged in a 20 ml sample flask at room temperature. After the adding 0.04 g amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 70% silica (A)/polyimide (BB) hybrid substrate.

EXAMPLE 10

Synthesis of 20% Nano-silica (B)/Polyimide (BB) Hybrid Substrate 2 g DMAc dispersion B and 8 g polyimide polymer solution BB were charged in a 20 ml sample flask at room temperature. After adding 0.08 g amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 20% silica (B)/polyimide (BB) hybrid substrate.

EXAMPLE 11

Synthesis of 30% Nano-silica (B)/Polyimide (BB) Hybrid Substrate 3 g DMAc dispersion B and 7 g polyimide polymer solution BB were charged in a 20 ml sample flask at room temperature. After adding 0.07 g amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 30% silica (B)/polyimide (BB) hybrid substrate.

EXAMPLE 12

Synthesis of 40% Nano-silica (B)/Polyimide (BB) Hybrid Substrate 4 g DMAc dispersion B and 6 g polyimide polymer solution BB were charged in a 20 ml sample flask at room temperature. After adding 0.06 g amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 40% silica (B)/polyimide (BB) hybrid substrate.

EXAMPLE 13

Synthesis of 50% Nano-silica (B)/Polyimide (BB) Hybrid Substrate 5 g DMAc dispersion B and 5 g polyimide polymer solution BB were charged in a 20 ml sample flask at room temperature. After adding 0.05 g amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 50% silica (B)/polyimide (BB) hybrid substrate.

EXAMPLE 14

Synthesis of 60% Nano-silica (B)/Polyimide (BB) Hybrid Substrate 6 g DMAc dispersion B and 4 g polyimide polymer solution BB were charged in a 20 ml sample flask at room temperature. After adding 0.04 g of amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 60% silica (B)/polyimide (BB) hybrid substrate.

EXAMPLE 15

Synthesis of 70% Nano-silica (B)/Polyimide (BB) Hybrid Substrate 7 g DMAc dispersion B and 3 g polyimide polymer solution BB were charged in a 20 ml sample flask at room temperature. After adding 0.04 g of amino-containing alkoxysilane ("Z6011" from Dow Corning), the mixture was stirred at room temperature for 30 minutes, and then coated on a glass sheet by blade coating. The wet coating was dried in an oven at temperatures of 50° C., 150° C., and 210° C., each for 1 hour. The dried coating was removed from the glass sheet to obtain a 70% silica (B)/polyimide (BB) hybrid substrate.

As can be seen from Table 1, by forming inorganic network using interconnected spherical particles, the coefficients of thermal expansion (CTEs) of the hybrid materials (Examples 4-9) decreased with increasing inorganic content (from 20% to 70%), while maintaining a high transmittance of above 89% with only a slight increase in yellowness (b value).

TABLE 1

| Spherical particle Interconnection | Transmittance (%) | CIE b value | CTE (ppm/° C.) | Elongation percentage (%) |
|---|---|---|---|---|
| Example 1 | 89.3 | 1.95 | 75.4 | 12.5 |
| Example 4 | 89.3 | 1.99 | 60.6 | 10.2 |
| Example 5 | 89.5 | 2.01 | 56.6 | 8.3 |
| Example 6 | 89.3 | 2.06 | 52.3 | 6.4 |
| Example 7 | 89.6 | 2.13 | 48.6 | 5.2 |
| Example 8 | 89.3 | 2.19 | 42.6 | 4.1 |
| Example 9 | 90.1 | 2.25 | 28.3 | 3.0 |

As can be seen from Table 2, by forming inorganic network using interconnected chain-shaped particles, the coefficients of thermal expansion (CTEs) of the hybrid materials (Examples 10-15) decreased with increasing inorganic content (from 20% to 70%), while maintaining a high transmittance above 89% with only a slight increase in yellowness (b value).

TABLE 2

| Chain-shaped particle Interconnection | Transmittance (%) | CIE b value | CTE (ppm/° C.) | Elongation percentage (%) |
|---|---|---|---|---|
| Example 10 | 89.3 | 1.91 | 62.6 | 10.1 |
| Example 11 | 89.4 | 2.18 | 49.8 | 7.7 |
| Example 12 | 89.5 | 2.13 | 44.5 | 6.5 |
| Example 13 | 89.3 | 2.11 | 38.5 | 4.5 |
| Example 14 | 89.6 | 2.10 | 31.7 | 3.2 |
| Example 15 | 89.8 | 2.05 | 25.1 | 2.1 |

EXAMPLE 16

Synthesis of 40% Nano-silica (A)/Polyimide (BB) Hybrid Substrate 4 g DMAc dispersion A and 6 g polyimide polymer solution BB were charged in a 20 ml sample flask at room temperature. After adding 0.06 g 3-aminomethyl-3,5,5-trimethylcyclohexylamine (IPDA; isophorone diamine) as catalyst, the mixture was stirred at room temperature for 60 minutes, and then coated on a glass sheet by blade coating. The wet coating was dried in an oven at temperatures of 50° C., 150° C., and 210° C., each for 1 hour. The dried coating was removed from the glass sheet to obtain a 40% silica (A)/polyimide (BB) hybrid substrate.

EXAMPLE 17

Synthesis of 50% Nano-silica (A)/Polyimide (BB) Hybrid Substrate 5 g DMAc dispersion A and 5 g polyimide polymer solution BB were charged in a 20 ml sample flask at room temperature. After adding 0.06 g 3-aminomethyl-3,5,5-trimethylcyclohexylamine (IPDA; isophorone diamine) as catalyst, the mixture was stirred at room temperature for 60 minutes, and then coated on a glass sheet by blade coating. The wet coating was dried in an oven at temperatures of 50° C., 150° C., and 210° C., each for 1 hour. The dried coating was removed from the glass sheet to obtain a 50% silica (A)/polyimide (BB) hybrid substrate.

EXAMPLE 18

Synthesis of 60% Nano-silica (A)/Polyimide (BB) Hybrid Substrate 6 g DMAc dispersion A and 4 g polyimide polymer solution BB were charged in a 20 ml sample flask at room temperature. After adding 0.06 g 3-aminomethyl-3,5,5-trimethylcyclohexylamine (IPDA; isophorone diamine) as catalyst, the mixture was stirred at room temperature for 60 minutes, and then coated on a glass sheet by blade coating. The wet coating was dried in an oven at temperatures of 50° C., 150° C., and 210° C., each for 1 hour. The dried coating was removed from the glass sheet to obtain a 60% silica (A)/polyimide (BB) hybrid substrate.

TABLE 3

| Spherical particle Interconnection | Transmittance (%) | CIE b value | CTE (ppm/° C.) | Elongation percentage (%) |
|---|---|---|---|---|
| Example 16 | 89.2 | 2.13 | 50.1 | 4.8 |
| Example 17 | 89.4 | 2.19 | 45.2 | 3.7 |
| Example 18 | 89.7 | 2.25 | 38 | 3.0 |

As can be seen from Table 3, by forming inorganic network using self-connected spherical particles, the coefficients of thermal expansion (CTEs) of the hybrid materials (Examples 16-17) decreased with increasing inorganic content (from 40% to 60%), while maintaining a high transmittance of above 89% with only a slight increase in yellowness (b value).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An organic/inorganic hybrid material, comprising
an organic polymer; and
a plurality of inorganic nanoparticles;
wherein the inorganic nanoparticles are self-connected and catalyzed either by a diamine or by a tertiary amine, or connected via a linker to constitute an inorganic network structure; and
wherein the linker comprises alkoxysilane or metal alkoxide.

2. The organic/inorganic hybrid material as claimed in claim 1, wherein the organic polymer comprises polyimide (PI), polyurethane (PU), polycarbonate (PC), polyarylate resin (PAR), poly(ether sulfones) (PES), cyclo-olefin copolymer (COC), or combinations thereof.

3. The organic/inorganic hybrid material as claimed in claim 1, wherein the inorganic nanoparticles have a diameter of about 5-500nm.

4. The organic/inorganic hybrid material as claimed in claim 1, wherein the inorganic nanoparticles are inorganic oxides.

5. The organic/inorganic hybrid material as claimed in claim 4, wherein inorganic oxide comprises silicon oxide, titanium oxide, aluminum oxide, zirconium oxide, vanadium oxide, chromium oxide, iron oxide, antimony oxide, tin oxide, or combinations thereof.

6. The organic/inorganic hybrid material as claimed in claim 1, wherein the linker is amino-containing alkoxysilane or amino-containing metal alkoxide.

7. The organic/inorganic hybrid material as claimed in claim 1, wherein the inorganic nanoparticles are present in an amount of about 20-80% by weight, based on the weight of the organic/inorganic hybrid material.

8. The organic/inorganic hybrid material as claimed in claim 1, wherein the inorganic nanoparticles are present in an amount of about 40-80% by weight, based on the weight of the organic/inorganic hybrid material.

9. The organic/inorganic hybrid material as claimed in claim 1, wherein the linker is present in an amount of about 0.1-100% by weight, based on the weight of the organic/inorganic hybrid material.

10. A method for fabricating the organic/inorganic hybrid material as set forth in claim 1, comprising
(a) providing an organic dispersion of inorganic nanoparticles; and
(b) mixing the organic dispersion with a polymer solution to form an organic/inorganic hybrid material, wherein the inorganic nanoparticles are self-connected or connected via a linker to constitute an inorganic network structure.

11. The method as claimed in claim 10, wherein step (a) comprises:
providing an aqueous dispersion of the inorganic nanoparticles; and
adding an organic solvent and a volatile solvent to the aqueous dispersion to proceed co-distillation to provide the organic dispersion of the inorganic nanoparticles.

12. The method as claimed in claim 10, wherein step (b) is carried out at room temperature for 0.5-24 hours.

13. The method as claimed in claim 10, wherein each of the organic dispersion and the polymer solution, independently, comprises an organic solvent comprising N-methyl-2-pyrrolidone (NMP), N,N-dimethylacetamide (DMAc), N,N-dimethylformamide (DMF), dimethyl sulfoxide (DMSO), γ-butyrolactone (GBL), xylene, toluene, or combinations thereof.

14. The method as claimed in claim 10, further comprising coating and drying the organic/inorganic hybrid material to form an organic/inorganic hybrid substrate.

15. The method as claimed in claim 10, wherein the inorganic nanoparticles are present in an amount of about 20-80% by weight, based on the weight of the organic/inorganic hybrid material.

16. The method as claimed in claim 10, wherein the linker is present in an amount of about 0.1-100% by weight, based on the weight of the inorganic nanoparticles.

17. The method as claimed in claim 10, wherein step (b) further comprises adding a catalyst for self-connection of the inorganic nanoparticles.

18. The method as claimed in claim 17, wherein the catalyst comprises diamine or tertiary amine.

19. The method as claimed in claim 17, wherein the catalyst is present in an amount of about 0.01-2% by weight, based on the weight of the organic/inorganic hybrid material.

20. The method as claimed in claim 18, wherein the diamine includes cycloaliphatic diamine.

\* \* \* \* \*